United States Patent
Lin

(10) Patent No.: US 8,670,453 B2
(45) Date of Patent: *Mar. 11, 2014

(54) ISOLATING NETWORK TRAFFIC IN MULTI-TENANT VIRTUALIZATION ENVIRONMENTS

(75) Inventor: Wayzen Lin, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 404 days.

This patent is subject to a terminal disclaimer.

(21) Appl. No.: 12/930,102

(22) Filed: Dec. 28, 2010

(65) Prior Publication Data

US 2011/0096789 A1 Apr. 28, 2011

Related U.S. Application Data

(63) Continuation of application No. 12/286,454, filed on Sep. 30, 2008, now Pat. No. 7,885,276.

(51) Int. Cl.
*H04L 12/28* (2006.01)
*H04J 1/16* (2006.01)

(52) U.S. Cl.
USPC .......................... 370/401; 370/412; 370/419

(58) Field of Classification Search
USPC .......................................... 370/401, 412, 419
See application file for complete search history.

(56) References Cited

U.S. PATENT DOCUMENTS

| | | | |
|---|---|---|---|
| 2003/0195942 A1* | 10/2003 | Muhlestein et al. | 709/215 |
| 2009/0216569 A1* | 8/2009 | Bonev et al. | 705/5 |
| 2011/0035494 A1* | 2/2011 | Pandey et al. | 709/224 |

* cited by examiner

*Primary Examiner* — John Pezzlo
(74) *Attorney, Agent, or Firm* — Muirhead and Saturnelli, LLC

(57) ABSTRACT

Managing data in a server system includes providing a plurality of servers, each having an internal gateway/switch that is accessible from outside the server, providing a plurality of virtual servers on at least some of the servers, where each of the virtual servers is accessible by the internal gateway/switch of the corresponding server, and accessing the data using the internal gateway/switch, where the internal gateway/switch determines which particular one of the virtual servers contain the data and then accesses the particular virtual server to provide the data. Managing data in a server system may also include associating portions of the data to tenants of the server system. Each of the servers may maintain a table that correlates tenants with the virtual servers maintained thereby and the internal gateway/switch may use the table to determine which particular one of the virtual servers contains data for a particular tenant.

20 Claims, 5 Drawing Sheets

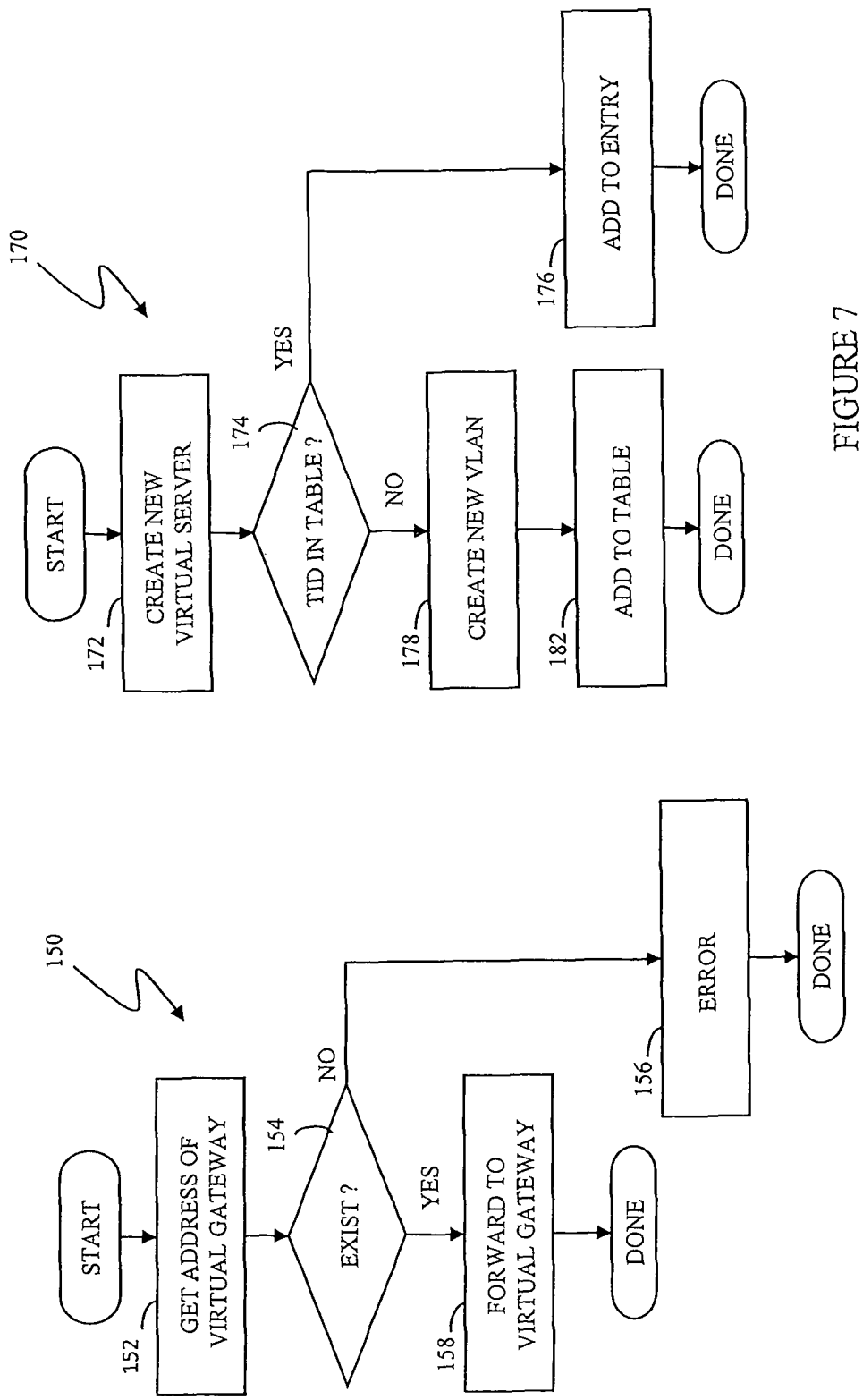

ISOLATING NETWORK TRAFFIC IN MULTI-TENANT VIRTUALIZATION ENVIRONMENTS

RELATED APPLICATIONS

This application is a continuation of U.S. application Ser. No. 12/286,454 filed Sep. 30, 2008 (now U.S. Pat. No. 7,885,276), which is hereby incorporated by reference.

BACKGROUND OF THE INVENTION

1. Technical Field

This application relates to the field of computer networks, and more particularly to the field of routing data between computing resources in a computer network.

2. Description of Related Art

In a virtualization environment, hosts use virtual switches to join tenants in a network fabric local to a server. Uplink ports on the switch may be connected to other virtual fabrics or to a real LAN through the host's physical network card. Co-locating diverse tenants in a virtualization environment requires a significant degree of resource isolation. Tenants on one virtual machine should not be able to access CPU processes, stored data, or the network traffic of another. Virtualization products in the market address this issue by assuming either a) tenants largely belong to the same organization, and/or b) the number of unique tenants is a relatively small number. A solution to the isolation problem is to assign each organization a unique VLAN ID. This insures that traffic belonging to each unique tenant is sufficiently isolated. Virtual switches automatically tag traffic from a particular tenant, transparently providing data isolation from other tenants.

This approach becomes problematic in dense, heterogeneous tenant environments due to limitations in VLAN technology. A conventional VLAN domain can support a maximum of 4094 unique IDs. This may be insufficient for use in large-scale, utility virtualization deployments. In addition, VLAN IDs may be managed directly at each switch, making configuring a VLAN is a time-consuming task involving synchronizing switch configurations all over the network. In a utility virtualization environment, tenancies may be dynamically allocated, terminated and/or modified (increasing or decreasing capacity) according to business requirements of the tenants. This can make network management extremely difficult and costly proposition.

Accordingly, it is desirable to provide a mechanism that overcomes any limitations associated with providing unique VLAN IDs and, in addition, addresses network management issues created by having tenants in a heterogeneous environment dynamically modify their tenancy.

SUMMARY OF THE INVENTION

According to the system described herein, managing data in a server system includes providing a plurality of servers, each having an internal gateway/switch that is accessible from outside the server, providing a plurality of virtual servers on at least some of the servers, where each of the virtual servers is accessible by the internal gateway/switch of the corresponding server, and accessing the data using the internal gateway/switch, where the internal gateway/switch determines which particular one of the virtual servers contain the data and then accesses the particular virtual server to provide the data. Managing data in a server system may also include associating portions of the data to tenants of the server system. Each of the servers may maintain a first table that correlates tenants with the virtual servers maintained thereby and the internal gateway/switch may use the first table to determine which particular one of the virtual servers contains data for a particular tenant. Entries of the first table may include a tenant id, at least one virtual server id, and at least one corresponding internal address at least one virtual server identified by the at least one virtual server id. Internal addresses of virtual servers may be VLAN IDs. Each of the servers may maintain a second table that correlates tenants with the virtual gateways/switches of other servers and the internal gateway/switch may use the second table to determine which of the other servers to forward data for a particular tenant. Managing data in a server system may also include providing an internal VLAN for each of the servers, where the virtual gateway/switch uses the internal VLAN to access the virtual servers. VLAN addresses for the virtual servers may be maintained internal to the corresponding server.

According further to the system described herein, computer software, provided in a computer readable medium, manages data in a server system. The software includes executable code that provides a plurality of virtual servers on servers of the server system, where each of the virtual servers is accessible by an internal gateway/switch of the corresponding server and executable code that accesses the data using the internal gateway/switch, where the internal gateway/switch determines which particular one of the virtual servers contain the data and then accesses the particular virtual server to provide the data. The computer software may also include executable code that associates portions of the data to tenants of the server system. Each of the servers may maintain a first table that correlates tenants with the virtual servers maintained thereby and the internal gateway/switch may use the first table to determine which particular one of the virtual servers contains data for a particular tenant. Entries of the first table may include a tenant id, at least one virtual server id, and at least one corresponding internal address at least one virtual server identified by the at least one virtual server id. Internal addresses of virtual servers may be VLAN IDs. Each of the servers may maintain a second table that correlates tenants with the virtual gateways/switches of other servers and the internal gateway/switch may use the second table to determine which of the other servers to forward data for a particular tenant. The computer software may also include executable code that provides an internal VLAN for each of the servers, where the virtual gateway/switch uses the internal VLAN to access the virtual servers. VLAN addresses for the virtual servers may be maintained internal to the corresponding server.

According further to the system described herein, a server provided in a server system includes an internal gateway/switch that receives and sends data for the server, at least one virtual server, coupled to the internal gateway/switch, where the at least one virtual server is inaccessible from outside the server and where data for the server is sent and received from and to the at least one virtual server through the internal gateway/switch. Portions of the data for the server may be associated with tenants of the server system. The server may maintain a table that correlates tenants with any virtual servers maintained by the server and the internal gateway/switch may use the table to determine which particular one of the virtual servers contains data for a particular tenant. The server may also include at least one internal VLAN disposed between the virtual gateway/switch and the at least one virtual server to provide data communication therebetween.

BRIEF DESCRIPTION OF DRAWINGS

Embodiments of the system are described with reference to the several figures of the drawings, noted as follows.

FIG. 6 is a flow chart illustrating steps performed in connection with transmitting data to an appropriate virtual gateway/switch according to an embodiment of the system described herein.

FIG. 7 is a flow chart illustrating steps performed by a virtual gateway/switch in connection with allocating a new virtual server according to an embodiment of the system described herein.

DETAILED DESCRIPTION OF VARIOUS EMBODIMENTS

Figure 1:
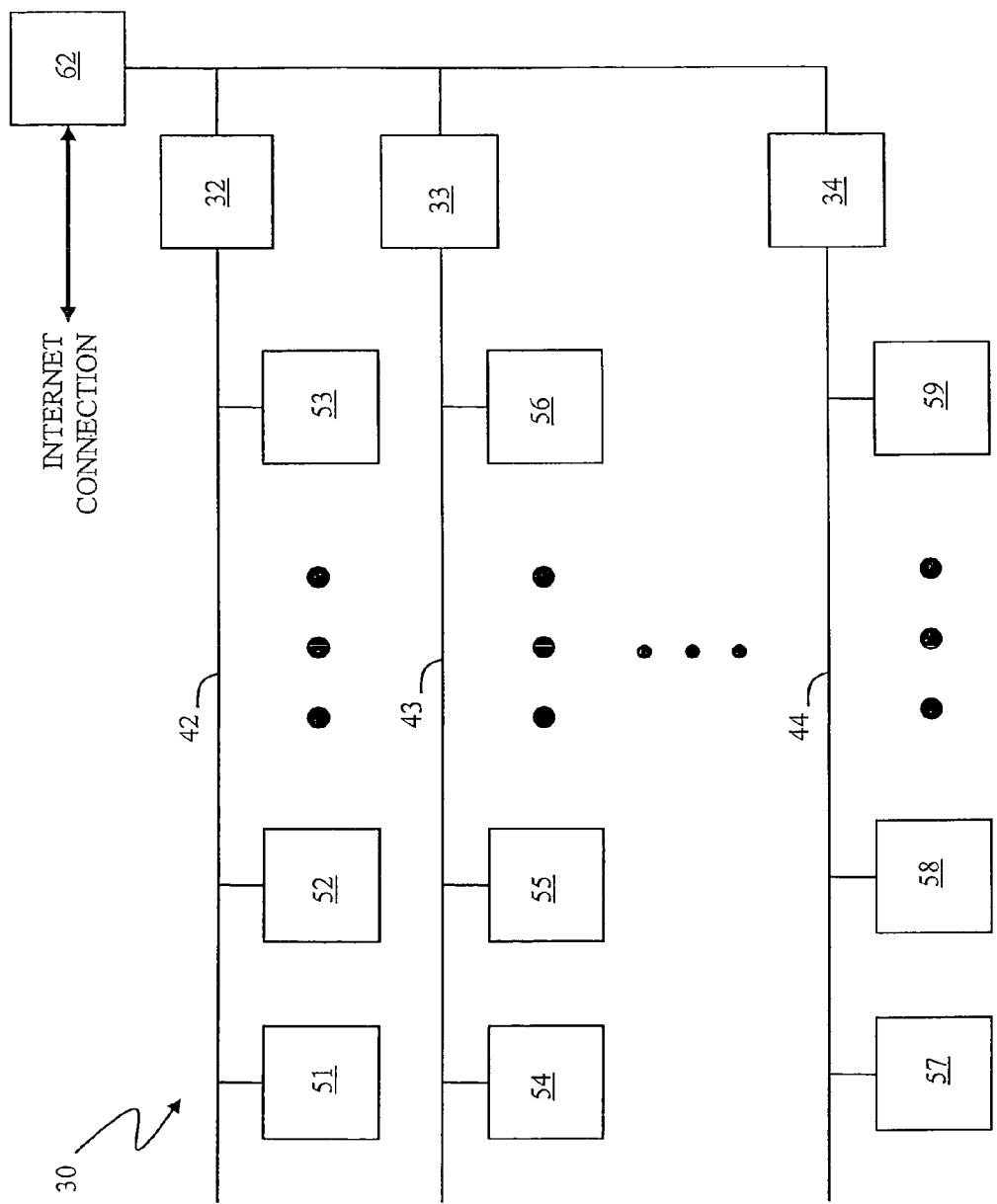
FIG. 1 is a schematic diagram showing a plurality of routers and servers in a server system according to an embodiment of the system described herein.

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

Referring to FIG. 1, a server system 30 includes a plurality of routers 32-34, each of which may be used to interconnection a plurality of subnets 42-44. Each of the subnets 42-44 includes a subset of a plurality of servers 51-59. The servers 51-59 may communicate using any of a number of appropriate protocols, such as TCP/IP. Each of the servers 51-59 may be provided with a private IP address (e.g., 192.168.X.X) or possibly a public IP address. The routers 32-34 manage data communications to and from the servers 51-59.

The server system 30 may include at least one other additional router 62 that manages data communication between the server system 30 and the Internet (and/or some other network or location), thus providing outside access to the server system 30. Note that it is possible to eliminate the router 62 altogether and have one or more of the other routers 32-34 manage communication to and from the server system 30. In an embodiment herein, the router 62 also provides appropriate security services, such as firewall protection.

Note also that, although each of the subnets 42-44 is shown as having three servers, the number of servers coupled to a subnet may be any number, possibly limited only by the physical address space of the subnet. In addition, there may be any number of subnets and, in some instances, the topology of the server system 30 may be different than that shown. Generally, a server system should be understood as including any system having a plurality of separately addressable servers that may be externally accessible (e.g., through the Internet).

Using virtualization software, one or more of the servers 51-59 may be subdivided into a plurality of virtual servers. Virtualization software allows multiple virtual machines with separate operating systems, to run in isolation on the same physical machine. Each virtual machine has its own set of virtual hardware (e.g., RAM, CPU, NIC, etc.) upon which an operating system and applications are loaded. The operating system sees a consistent, normalized set of hardware regardless of the actual physical hardware components. A number of virtualization software products exist, including VMware provided by EMC Corporation of Hopkinton, Mass.

A benefit of providing virtual servers is the ability to host multiple, unrelated, tenants (users) in a single physical server. For example, three unrelated tenants, each hosting their own a Web site, may all reside on a single one of the servers 51-59 that is running virtualization software to present what looks like a single stand-alone server to each of the tenants as well as other visitors to the Web sites. The virtualization software maintains separation of each of the tenants, which each separately access their own virtual server(s).

Additional separation may be provided using one or more VLANs, where one or more of the single physical networks is logically divided into discrete logical LANs that can operate independently of each other. A first group of servers belonging to a VLAN that is on a particular physical LAN may operate independently of a second group of servers on the same physical LAN but belonging to a different VLAN. Note also that servers on different physical LANs may belong to the same VLAN. Thus, for example, if the server 51 and the server 55 were on a first VLAN and the server 52 were on a second VLAN, then the servers 51, 55 would operate as if on the same subnet while the server 52 would operate as if on a different subnet even though the servers 51, 52 are on the same physical subnet 42. The VLAN may be implemented using one or more of the routers 32-34, 64 and/or appropriate VLAN software, which may be configured to route data communications according to VLAN topology rather than physical topology. Any conventional VLAN implementation may be used, such as that provided by Cisco Systems.

Although each of the virtual servers residing in each of the servers 51-59 may be provided with its own VLAN according to a particular tenant using one or more of the virtual servers, doing so has limitations. As discussed above, there is a limit to the total number of VLANs that may be present in a physical LAN and, in addition, there may be undesirable complexities associate with configuring and reconfiguring VLANs. The system described herein addresses these.

Figure 2:
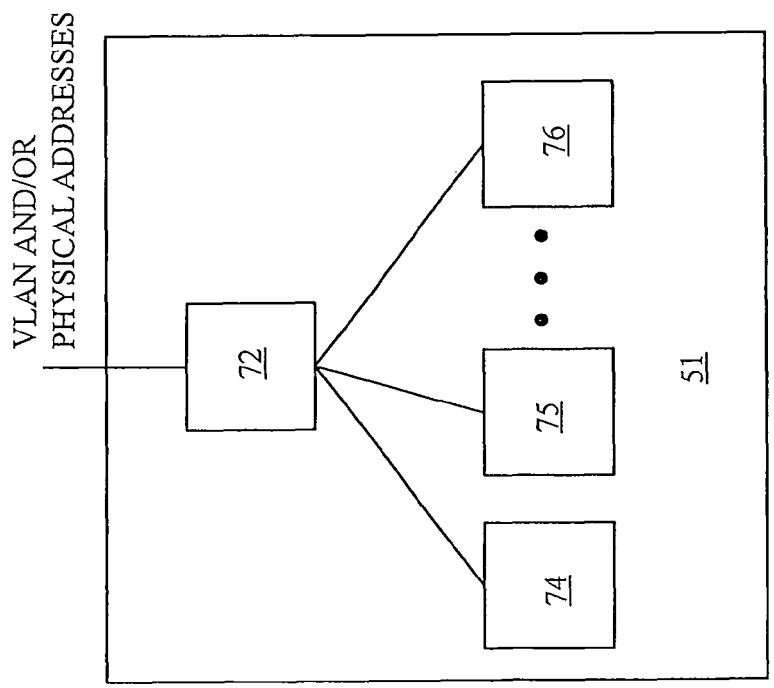
FIG. 2 is a schematic diagram showing a server with a virtual gateway/switch and a plurality of virtual servers according to an embodiment of the system described herein.

Referring to FIG. 2, the server 51 is shown in more detail as including a virtual gateway/switch 72 (implemented, for example, using a virtual server) and a plurality of other virtual servers 74-76. The virtual servers 74-76 represent any number of virtual servers coupled to the virtual gateway/switch 72. Note also that the system described herein may have just one virtual server coupled to the virtual gateway/switch 72. The virtual gateway/switch 72 is addressable from outside the server 51 using at least one physical address and/or at least one VLAN address (VLAN ID). In an embodiment herein, the virtual gateway/switch 72 may handle internal traffic using a first VLAN address, external traffic using a second VLAN address, and handle management traffic to allocate and deallocate virtual servers (explained in more detail elsewhere herein) using a third VLAN address, but of course other configurations are possible, including, without limitation, using a single address (VLAN or physical) for all traffic and/or using one or more physical addresses of the server 51 for at least some of the traffic to and from the virtual gateway/switch 72.

The virtual gateway/switch 72 may act as a gateway, a firewall, and a switch for the virtual servers 74-76. Thus, communication to and from the virtual servers 74-76 is through the virtual gateway/switch 72, in a manner similar to a LAN connecting to the Internet through a gateway/router/firewall where components of the LAN have private addresses for use only within the LAN and communicating entities outside the LAN communicate only with the gateway/router/firewall. Some or all of the other servers 52-59 may be configured in a manner similar to that discussed herein for the server 51. Accordingly, for the discussion herein regarding the server 51, it may be assumed that the same or similar functionality may be provided on some or all of the remaining servers 52-59 of the server system 30.

Figure 3:
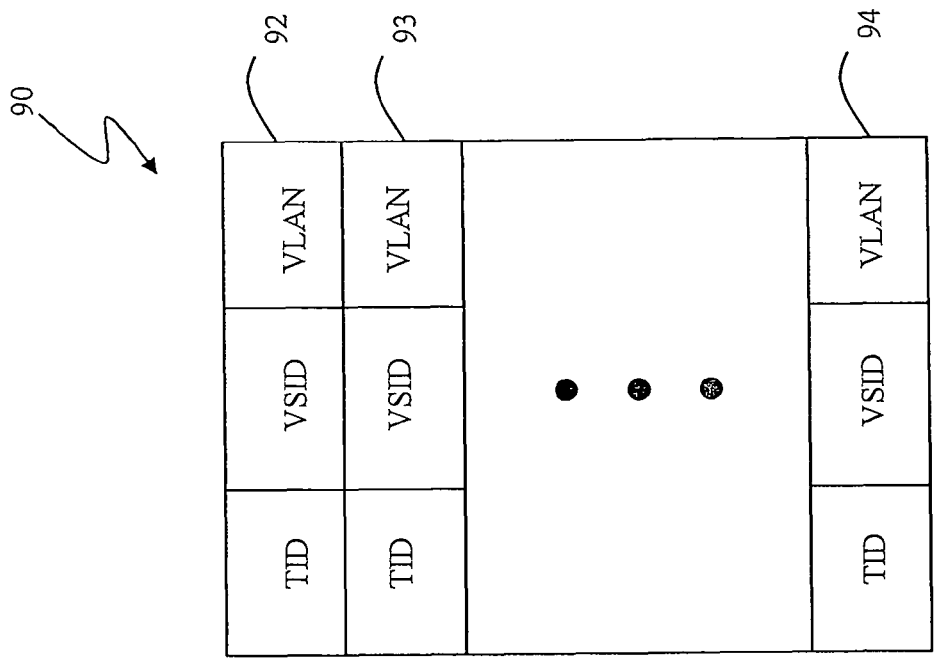
FIG. 3 is a schematic diagram showing a table used by a virtual gateway/switch for receiving data and managing virtual servers according to an embodiment of the system described herein.

Referring to FIG. 3, a table 90 is provided at the virtual gateway/switch 72 to correlate tenant identifiers with the virtual servers 74-76 coupled to the virtual gateway/switch 72. In an embodiment herein, each of the separate tenants of the server system 30 may be provided with a unique numeric identifier that distinguishes that tenant from all other tenants of the server system 30. The total number of tenants may be limited only by the number of possible unique identifiers and perhaps by the practical capacity of the server system 30.

The table 90 is used by the virtual gateway/switch 72 to route incoming data traffic to one of the virtual servers. The table 90 has a plurality of entries 92-94, each of which may be for a different tenant having one or more corresponding ones of the virtual server devices 74-76 coupled to the virtual gateway/switch 72. Each of the entries has a tenant id (TID) field, which is the unique numeric tenant identifier, a virtual server device id (VSID) field, which identifies one or more of the virtual server devices 74-76 for that tenant, and a VLAN identifier, which provides a VLAN address for the one or more of the virtual server devices 74-76 identified by the VSID field. In an embodiment herein, the virtual gateway/switch 72 manages an internal VLAN for communicating with the virtual servers 74-76 in a way that separates data traffic for the different tenants. The internal VLAN is not provided outside the server 51 and so there is no relationship between a VLAN address inside the server 51 and an identical VLAN address inside any of the other ones of the servers 52-59. Note that a single entry for a tenant may correspond to multiple virtual servers. Thus, the VSID and VLAN fields may be a list of virtual server identifiers and VLAN addresses rather than an identifier and address for a single virtual server. Note also that the VSID field may contain information for an external entity to distinguish among virtual servers for the same tenant (e.g., MAILSERVER, DBSERVER, etc.).

Figure 4:
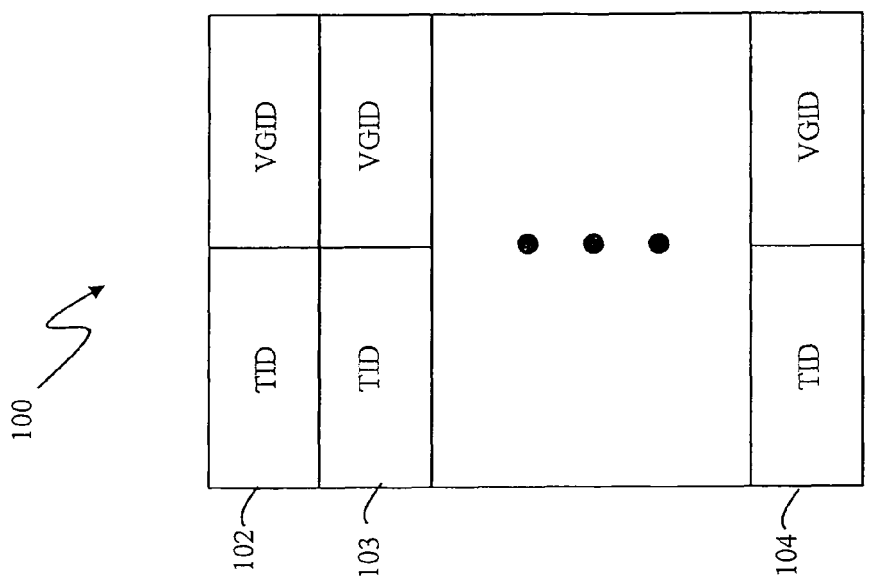
FIG. 4 is a schematic diagram showing a table used by a virtual gateway/switch for transmitting data according to an embodiment of the system described herein.

Referring to FIG. 4, a table 100 is provided at the virtual gateway/switch 72 to correlate tenant identifiers with virtual gateways/switches of other ones of the servers 52-59 in the server system. The table 100 is used to handle outgoing traffic from one of the virtual server devices 74-76 to virtual server devices hosted on another one of the servers 52-59. In an embodiment herein, virtual servers for a particular tenant may be provided on different ones of the servers 51-59. Thus, a virtual server for a particular tenant on one of the servers 51-59 may send data to a virtual server for the same tenant on a different one of the servers 51-59. Of course, there are other reasons why a virtual server on one of the servers 51-59 sends data to a different virtual server on another one of the servers 51-59.

The table 100 includes a plurality of entries 102-104, where each of the entries 102-104 has a tenant identifier (TID) and a virtual gateway/switch address (VGADDR). As discussed elsewhere herein, each virtual gateway/switch of each of the servers 51-59 is separately addressable with either a physical address or a VLAN address. Note that the VLAN addresses used in the table 90, discussed above, is different from the VLAN addresses that may be used in the table 100. The VLAN addresses used in the table 90 are private VLAN addresses the are used internally at the server 51 while any VLAN addresses used in the table 100 are known to multiple servers and possibly other external entities.

Note that each of the tables 90, 100 may be maintained using any appropriate data structure and that the data structure of one of the tables 90, 100 is independent of the data structure of the other one of the tables 90, 100. Appropriate data structures include, without limitation, arrays, linked lists, and doubly linked lists.

Figure 5:
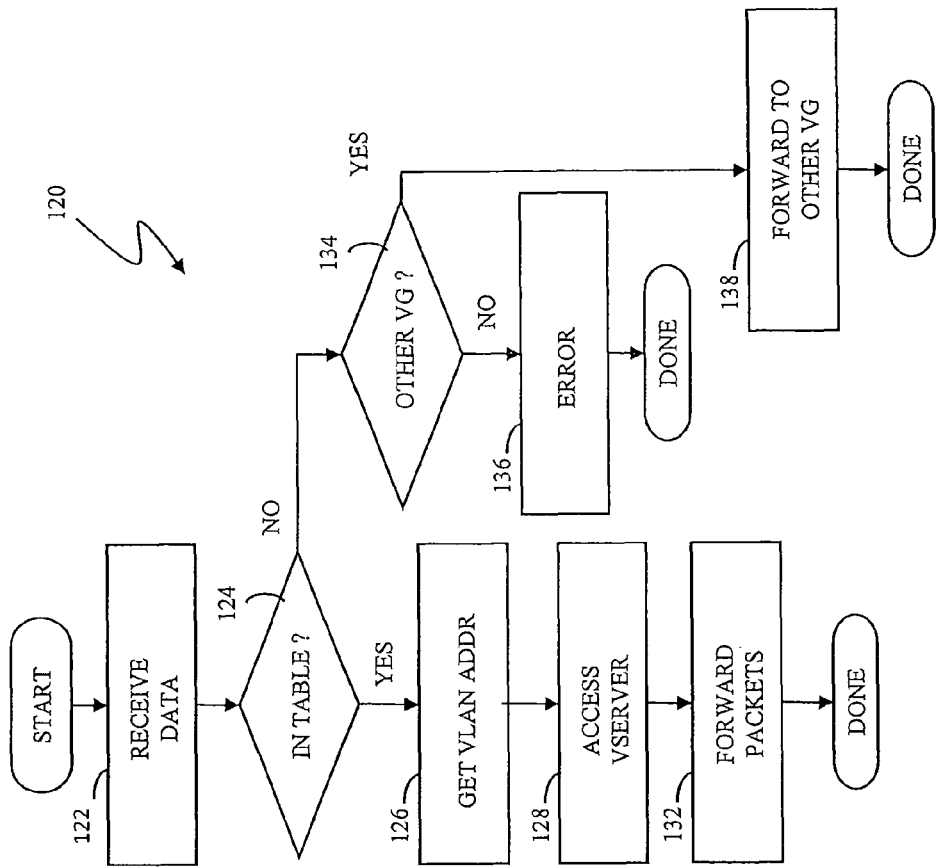
FIG. 5 is a flow chart illustrating steps performed by a virtual gateway/switch in connection with receiving data and directing the data to an appropriate virtual server according to an embodiment of the system described herein.

Referring to FIG. 5, a flow chart 120 illustrates steps performed at the virtual gateway/switch 72 in connection with receiving incoming data. Data is provided with information identifying the destination tenant and possibly other distinguishing information (e.g., MAILSERVER, DBSERVER, etc.). Processing begins at a first step 122 where the data is received. Following the step 122 is a test step 124 where it is determined if the data that was received is destined for a tenant/virtual server combination managed by the receiving one of the servers 51-59. In some instances, data may be sent to a server that does not contain the appropriate virtual server for the tenant.

If it is determined that the receiving one of the servers 51-59 contains the virtual server for the tenant, then control transfers from the step 124 to a step 126 where the server obtains the VLAN address (from the table 90) of the internal VLAN. Following the step 126 is a step 128 where the server accesses the appropriate server to write the incoming data. Note that, in cases where there are multiple virtual servers for the same tenant, distinguishing information (e.g., MAILSERVER) may be used to choose one of the virtual servers or, in instances where the virtual servers are effectively identical (e.g., multiple identical copies of a Web site host), the virtual gateway/switch 72 may simply choose between the identical virtual servers using any appropriate technique (e.g., round robin). Following the step 128, control transfers to a step 132 where the packets are forwarded to the appropriate one of the virtual servers. Following the step 132, processing is complete.

If it is determined at the test step 124 that the receiving one of the servers 51-59 does not contain a virtual server for the tenant, then control transfers from the step 124 to a test step 134 where it is determined if the tenant is located on another one of the servers 51-59. The test at the step 134 looks at data such as the table 100, discussed above, to determine if the tenant exists in the server system 30. If not, then control passes from the step 134 to a step 136 where error processing is performed, such as informing the user (call process) that an unsuccessful attempt was made to write data to a virtual server of a nonexistent tenant. Following the step 136, processing is complete.

If it is determined at the test step 134 that the destination tenant is located on another one of the servers 51-59, then control transfers from the test step 134 to a step 138, where the data is forwarded to the virtual gateway/switch of the other one of the servers 52-59. As discussed elsewhere herein, the table 100 contains the address (VLAN address or physical address) of the virtual gateway/switch of each of the servers 51-59 other than the virtual gateway/switch that received the data. At the step 138, the data is forwarded to the virtual gateway/switch for the tenant that is to receive the data. Following the step 138, processing is complete.

Referring to FIG. 6, a flow chart 150 illustrates steps performed by the virtual gateway/switch 72 in connection with providing data to a virtual server located on a different server than the server 51 that contains the virtual gateway/switch. The data is addressable according to the tenant ID. Note that it is possible for virtual servers for a tenant to span multiple ones of the servers 51-59. Thus, it is possible for a first virtual server for a tenant to need to send data to a second virtual server of the same tenant where the two virtual servers are located on different ones of the servers 51-59.

Processing begins at a first step 152 where the virtual gateway/switch 72 obtains the address of the virtual gateway/switch on the other one of the servers 52-59 by, for example, scanning the table 100 to match the tenant ID. Following the step 152 is a test step 154 where it is determined if the tenant ID exists in the table 100. If not, it is an error (e.g., "Tenant ID Not Found") and control passes from the test step 154 to a step 156 where appropriate error processing is performed, such as returning an appropriate error code to the calling process. Following the step 156, processing is complete.

If it is determined at the test step 154 that the tenant ID exists, then control passes from the test step 154 to a step 158 where the data is forwarded to the one or more virtual gateways/switches containing virtual server(s) for the tenant. In other embodiments, it is possible to instead forward the data to another entity in the server system 30 (e.g., one of the routers 32-34, 62, another server, etc.) that then forwards the data to the appropriate virtual gateway(s)/switch(es). In fact, it is possible to shift some or all of the processing illustrated by the flow chart 150 other entities in the server system 30. Following the step 158, processing is complete. Note that portions of the processing illustrated by the flow chart 150 may be implemented using conventional firewall technology.

Referring to FIG. 7, a flow chart 170 illustrates steps performed by the virtual gateway/switch 72 in connection with receiving a command to create a new virtual server on behalf of a particular tenant. The command may be provided to the virtual gateway/switch 72 by an entity external to the virtual gateway/switch 72 that handles centralized management for the server system 30. The entity may be one of the servers 51-59, one of the routers 32-34, 62, and/or some other entity internal or external to the server system 30. In an embodiment herein, centralized management of the server system is provided by a workstation having an appropriate GUI for a human operator. The workstation may use any appropriate load balancing algorithms or other algorithms to determine the location of virtual servers and/or the operator may manually choose the locations of at least some of the virtual servers. Security provisions may be provided to restrict operations to authorized users.

Processing begins at a step 172 where the virtual gateway/switch 72 creates a new virtual server. Following the step 172 is a test step 174 where it is determined if there is already an entry in the table 90 corresponding to the TID of the new virtual server. As discussed elsewhere herein, there may be more than one virtual server for a particular tenant. The test at the step 174 determines if one of the virtual servers 74-76 that is already managed by the virtual gateway/switch 72 corresponds the same tenant as the new virtual server. If so, then control transfers from the test step 174 to a step 176 where information about the new virtual server (including a new VLAN address for the existing VLAN) is added to the entry in the table 90 for the TID. Following the step 176, processing is complete.

If it is determined at the test step 172 that there is not already an entry in the table 90 corresponding to the TID of the new virtual server (and thus the TID is new), then control transfers from the step 172 to a step 178 where the virtual gateway/switch 72 creates a new VLAN for the new TID. As discussed elsewhere herein, the VLAN is internal to the server 51 for use by the virtual gateway/switch 72 and the virtual servers 74-76. Following the step 178 is a step 182 where a new entry is added to the table 90. The new entry contains the new TID, the virtual server created at the step 172, and a VLAN address for the VLAN created at the step 178. Following the step 182, processing is complete.

Note that, although not shown explicitly in the flow chart 170 of FIG. 7, the virtual gateway/switch 72 may return a result to the calling process indicating that the new virtual server was successfully created (or not). However, as discussed elsewhere herein, access to the virtual servers 74-76 is restricted to the virtual gateway/switch 72. Thus, no processes or servers outside of the server 51 need information about the new virtual server other than that it was successfully created and, possibly, other identifying information (e.g., MAILSERVER, SERVER2, etc.) that may be passed to the virtual gateway/switch 72 on subsequent accesses of the new virtual server.

Figure 8:
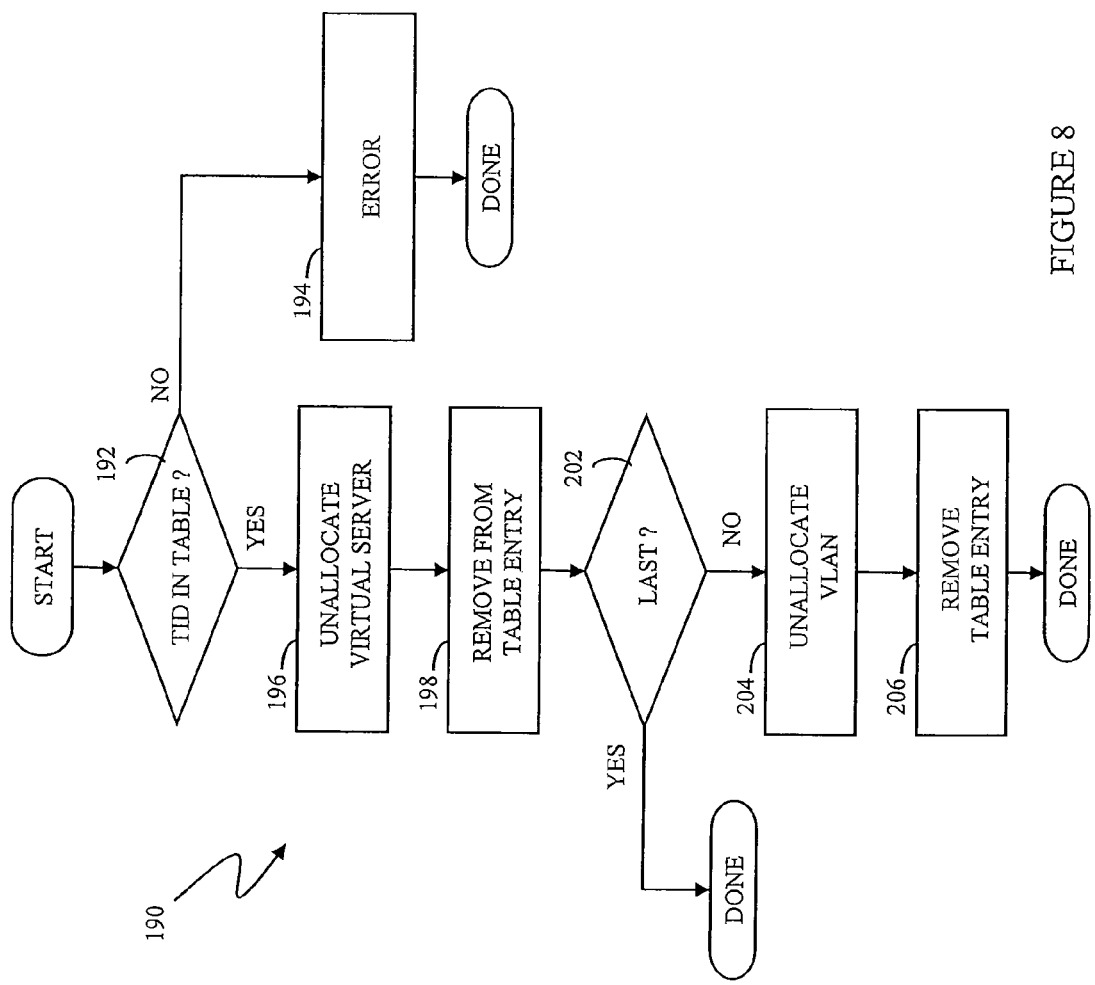
FIG. 8 is a flow chart illustrating steps performed by a virtual gateway/switch in connection with deallocating a virtual server according to an embodiment of the system described herein.

Referring to FIG. 8, a flow chart 190 illustrates steps performed by the virtual gateway/switch 72 in connection with receiving a command to deallocate (destroy) a virtual server. Just as with the command to create a new virtual server, the command may be provided by an entity that handles centralized management for the server system 30. Processing begins at a first step 192 where it is determined if the TID for the virtual server being eliminated is in the table 90. If not, then control transfers to a step 192 where error processing is performed (e.g., return result to calling entity). Following the step 192, processing is complete.

If it is determined at the test step 192 that the TID for the virtual server being eliminated is in the table 90, then control transfers from the test step 192 to a step 196 where the virtual server is deallocated (or handled by whatever mechanism is used to maintain the virtual servers 74-76). Following the step 196 is a step 198 where information about the virtual server being eliminated is removed from the table 90. Following the step 198 is a test step 202 where it is determined if the virtual server being eliminated was the last one (the only one) for the tenant. If not, then processing is complete. Otherwise, control transfers from the test step 202 to a step 204 where the VLAN used by the tenant is deallocated (or handled by whatever mechanism is used to maintain the internal VLANs). Essentially, the virtual gateway/switch 72 no longer needs the VLAN so the VLAN is made available for future use at the step 204. Following the step 204 is a step 206 where the entry in the table 90 corresponding to the tenant is removed. Following the step 206, processing is complete.

In some instances, the order of steps in the flowcharts may be modified, where appropriate. The system described herein may be implemented using the hardware described herein, variations thereof, or any other appropriate hardware capable of providing the functionality described herein. Any appropriate servers/routers may be used. Some or all of the routers may be replaced with other devices and/or some or all of the services provided by the routers may be provided by some or all of the servers. In addition, the internal VLANs used by the virtual gateways/switches may be replaced by any other mechanism capable of providing the functionality described herein. The functionality of the virtual gateway/switch may be provided using hardware, software, or some combination thereof and may be provided using a single component or multiple components. The system also includes computer software, in a computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method of using a processor to manage data in a server system, comprising:
   providing a plurality of servers, each having an internal gateway/switch that is accessible from outside the server, wherein each of the servers maintains a first table that correlates tenants with the virtual servers maintained thereby;
   providing a plurality of virtual servers on at least some of the servers, wherein each of the virtual servers is accessible by the internal gateway/switch of the corresponding server; and
   accessing the data using the internal gateway/switch, wherein the internal gateway switch determines which particular one of the virtual servers contain the data and then accesses the particular virtual server to provide the data.

2. A method, according to claim 1, further comprising:
   associating portions of the data to tenants of the server system.

3. A method, according to claim 2, wherein the internal gateway/switch uses the first table to determine which particular one of the virtual servers contains data for a particular tenant.

4. A method, according to claim 3, wherein entries of the first table include a tenant id, at least one virtual server id, and at least one corresponding internal address at least one virtual server identified by the at least one virtual server id.

5. A method, according to claim 4, wherein internal addresses of virtual servers are VLAN IDs.

6. A method, according to claim 3, wherein each of the servers maintains a second table that correlates tenants with the virtual gateways/switches of other servers and wherein the internal gateway/switch uses the second table to determine which of the other servers to forward data for a particular tenant.

7. A method, according to claim 1, further comprising:
   providing an internal VLAN for each of the servers, wherein the virtual gateway/switch uses the internal VLAN to access the virtual servers.

8. A method, according to claim 7, wherein VLAN addresses for the virtual servers are maintained internal to the corresponding server.

9. Computer software, provided in a non-transitory computer readable medium, that manages data in a server system, the software comprising:
   executable code that provides a plurality of virtual servers on servers of the server system, wherein each of the virtual servers is accessible by an internal gateway/switch of the corresponding server and wherein each of the servers maintains a first table that correlates tenants with the virtual servers maintained thereby; and
   executable code that accesses the data using the internal gateway/switch, wherein the internal gateway/switch determines which particular one of the virtual servers contain the data and then accesses the particular virtual server to provide the data.

10. Computer software, according to claim 9, further comprising:
    executable code that associates portions of the data to tenants of the server system.

11. Computer software, according to claim 10, wherein the internal gateway/switch use the first table to determine which particular one of the virtual servers contains data for a particular tenant.

12. Computer software, according to claim 11, wherein entries of the first table include a tenant id, at least one virtual server id, and at least one corresponding internal address at least one virtual server identified by the at least one virtual server id.

13. Computer software, according to claim 12, wherein internal addresses of virtual servers are VLAN IDs.

14. Computer software, according to claim 11, wherein each of the servers maintains a second table that correlates tenants with the virtual gateways/switches of other servers and wherein the internal gateway/switch uses the second table to determine which of the other servers to forward data for a particular tenant.

15. Computer software, according to claim 9, further comprising:
    executable code that provides an internal VLAN for each of the servers, wherein the virtual gateway/switch uses the internal VLAN to access the virtual servers.

16. Computer software, according to claim 15, wherein VLAN addresses for the virtual servers are maintained internal to the corresponding server.

17. A server provided in a server system, comprising:
    an internal gateway/switch that receives and sends data for the server; and
    at least one virtual server, coupled to the internal gateway/switch, wherein the at least one virtual server is inaccessible from outside the server and wherein data for the server is sent and received from and to the at least one virtual server through the internal gateway/switch and wherein the at least one virtual server maintains a table that correlates tenants with any virtual servers maintained thereby.

18. A server, according to claim 17, wherein portions of the data for the server is associated with tenants of the server system.

19. A server, according to claim 18, wherein the internal gateway/switch uses the table to determine which particular one of the virtual servers contains data for a particular tenant.

20. A server, according to claim 17, further comprising:
    at least one internal VLAN disposed between the virtual gateway/switch and the at least one virtual server to provide data communication therebetween.

* * * * *